(12) United States Patent
Kimura et al.

(10) Patent No.: US 11,718,229 B2
(45) Date of Patent: Aug. 8, 2023

(54) IMAGE PROCESSING DEVICE AND IMAGE PROCESSING METHOD

(71) Applicant: RENESAS ELECTRONICS CORPORATION, Tokyo (JP)

(72) Inventors: Mitsuhiro Kimura, Tokyo (JP); Akihide Takahashi, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 334 days.

(21) Appl. No.: 17/076,531

(22) Filed: Oct. 21, 2020

(65) Prior Publication Data

US 2021/0150250 A1     May 20, 2021

(30) Foreign Application Priority Data

Nov. 19, 2019  (JP) .............................. JP2019-208570

(51) Int. Cl.
*G06V 20/40* (2022.01)
*B60R 1/00* (2022.01)
(Continued)

(52) U.S. Cl.
CPC ................ *B60R 1/00* (2013.01); *G06V 10/50* (2022.01); *G06V 10/56* (2022.01); *G06V 10/60* (2022.01);
(Continued)

(58) Field of Classification Search
CPC ........ G06V 10/50; G06V 10/56; G06V 10/46; G06V 10/42; G06V 10/60; G06V 10/40; G06V 20/56; B60R 1/00; B60R 2300/302
See application file for complete search history.

(56) References Cited

U.S. PATENT DOCUMENTS 8,436,942 B2   5/2013  Kanda
8,463,038 B2 * 6/2013  Sakai ...................... G06T 5/008
                                                    382/173
(Continued)

FOREIGN PATENT DOCUMENTS

JP    2011-237690 A    11/2011
JP    2016-031492 A     3/2016
(Continued)

OTHER PUBLICATIONS

Japanese Notice of Reasons for Refusal issued in corresponding Japanese Patent Application No. 2019-208570, dated Dec. 20, 2022, with English translation.

(Continued)

*Primary Examiner* — Shaghayegh Azima
(74) *Attorney, Agent, or Firm* — McDermott Will & Emery LLP

(57) ABSTRACT

The image processing device acquires feature quantities (maximum value, minimum value, average value, histogram, etc.) of the entire area (GA) of the image and feature quantities of each local area (LA) of the image from the input image, and calculates a plurality of modulation gain values (gamma correction curves) for GA and each LA. Furthermore, the image processing device determines the correction intensity for each LA from the feature quantity of the GA and the feature quantity of each LA, and creates the LA correction intensity map. Finally, the image processing device finally applies the result of combining a plurality of modulation gain values based on the LA correction intensity map to the input image.

5 Claims, 15 Drawing Sheets

(51) Int. Cl.
  *G06V 10/50* (2022.01)
  *G06V 10/56* (2022.01)
  *G06V 10/60* (2022.01)
  *G06V 20/56* (2022.01)

(52) U.S. Cl.
  CPC ........ *G06V 20/46* (2022.01); *B60R 2300/302* (2013.01); *G06V 20/56* (2022.01)

(56) References Cited

U.S. PATENT DOCUMENTS

| | | | |
|---|---|---|---|
| 9,113,047 B2 | 8/2015 | Onuma et al. | |
| 9,805,663 B2 | 10/2017 | Kawaguchi | |
| 2008/0252791 A1* | 10/2008 | Mitsunaga | H04N 9/68 348/673 |
| 2011/0006891 A1* | 1/2011 | Cho | H04N 7/18 340/441 |
| 2013/0083248 A1* | 4/2013 | Suzuki | G06T 5/007 348/E5.115 |
| 2015/0293342 A1* | 10/2015 | Kawashima | G01B 11/24 348/80 |
| 2016/0019863 A1 | 1/2016 | Chuang | |
| 2016/0057352 A1* | 2/2016 | Yoneda | H04N 23/689 348/208.4 |
| 2017/0243093 A1* | 8/2017 | Jung | G06K 15/1836 |
| 2018/0204523 A1* | 7/2018 | Harada | G09G 3/006 |
| 2021/0064905 A1* | 3/2021 | Gulati | G06F 3/04817 |
| 2021/0160432 A1* | 5/2021 | Yamamoto | H04N 23/71 |
| 2022/0222876 A1* | 7/2022 | Loui | G06T 11/60 |

FOREIGN PATENT DOCUMENTS

| | | |
|---|---|---|
| JP | 2017-197044 A | 11/2017 |
| WO | 2012053105 A1 | 4/2012 |

OTHER PUBLICATIONS

Japanese Notice of Reasons for Refusal issued in corresponding Japanese Patent Application No. 2019-208570, dated May 16, 2023, with English translation.

* cited by examiner

FIG. 3A

| 0 | 0 | 0   | 0 | 0 | 0 | 0 | 0 |
|---|---|-----|---|---|---|---|---|
| 0 | 0 | 0.9 | 1 | 0 | 0 | 0 | 0 |
| 0 | 0 | 0.9 | 1 | 0 | 0 | 0 | 0 |
| 0 | 0 | 0.9 | 1 | 0 | 0 | 0 | 0 |
| 0 | 0 | 0   | 0 | 0 | 0 | 0 | 0 |
| 0 | 0 | 0   | 0 | 0 | 0 | 0 | 0 |
| 0 | 0 | 0   | 0 | 0 | 0 | 0 | 0 |
| 0 | 0 | 0   | 0 | 0 | 0 | 0 | 0 |

FIG. 3B

| 0.1 | 0.1 | 0.1 | 0.1 | 0.1 | 0.1 | 0.1 | 0.1 |
|-----|-----|-----|-----|-----|-----|-----|-----|
| 0.1 | 0.1 | 0.9 | 1   | 1   | 0.1 | 0.1 | 0.1 |
| 0.1 | 0.1 | 0.9 | 1   | 1   | 0.1 | 0.1 | 0.1 |
| 0.1 | 0.1 | 0.9 | 1   | 1   | 0.1 | 0.1 | 0.1 |
| 0   | 0   | 0   | 0   | 0   | 0   | 0   | 0   |
| 0   | 0   | 0   | 0   | 0   | 0   | 0   | 0   |
| 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 |

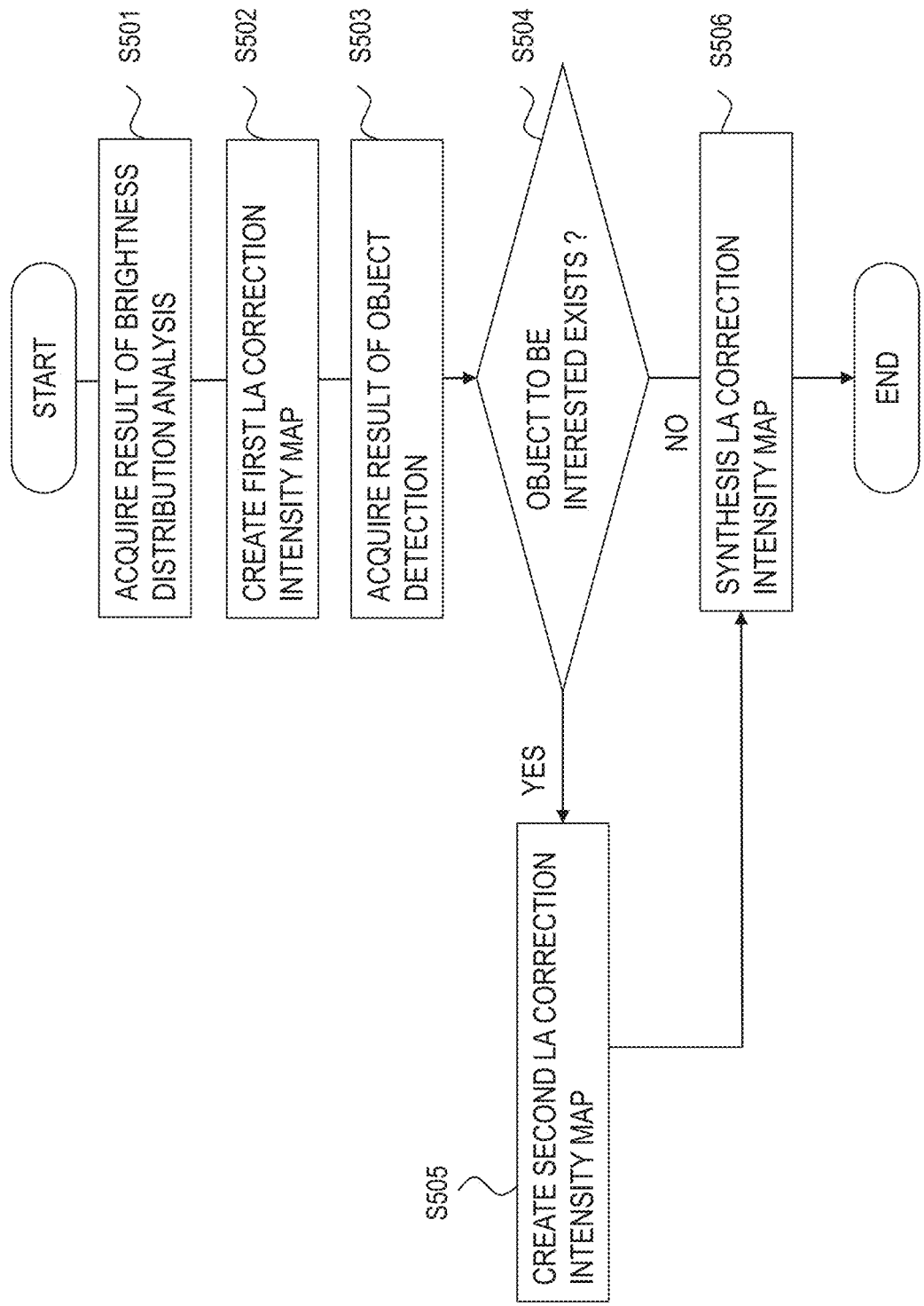

| 0 | 0 | 0.7 | 0.7 | 0.7 | 0.7 | 0 | 0 |
|---|---|---|---|---|---|---|---|
| 0 | 0 | 0.7 | 0.7 | 0.7 | 0.7 | 0 | 0 |
| 0 | 0 | 0 | 0.7 | 0.7 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0.7 | 0.7 | 0 | 0 | 0 |
| 0 | 0 | 0.7 | 0.7 | 0.7 | 0.7 | 0 | 0 |
| 0 | 0 | 0.7 | 0.7 | 0.7 | 0.7 | 0 | 0 |
| 0 | 0 | 0 | 0.7 | 0.7 | 0 | 0 | 0 |
| 0 | 0 | 0 | 0 | 0 | 0 | 0 | 0 |
| 0 | 0 | 0 | 0 | 0 | 0 | 0 | 0 |

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0.7 | 0.7 | 0 | 0 | 0 |
| 0 | 0 | 0.7 | 0.7 | 0.7 | 0.7 | 0 | 0 |
| 0 | 0 | 0.7 | 0.7 | 0.7 | 0.7 | 0 | 0 |

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0.7 | 0.7 | 0 | 0 | 0 | 0 | 0 | 0 |
| 0.7 | 0.7 | 0.7 | 0 | 0 | 0 | 0 | 0 |
| 0.7 | 0.7 | 0.7 | 0 | 0 | 0 | 0 | 0 |
| 0.7 | 0.7 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0.7 | 0.7 |
| 0 | 0 | 0 | 0 | 0 | 0.7 | 0.7 | 0.7 |
| 0 | 0 | 0 | 0 | 0 | 0.7 | 0.7 | 0.7 |
| 0 | 0 | 0 | 0 | 0 | 0 | 0.7 | 0.7 |
| 0 | 0 | 0 | 0 | 0 | 0 | 0 | 0 |
| 0 | 0 | 0 | 0 | 0 | 0 | 0 | 0 |

IMAGE PROCESSING DEVICE AND IMAGE PROCESSING METHOD

CROSS-REFERENCE TO RELATED APPLICATIONS

The disclosure of Japanese Patent Application No. 2019-208570 filed on Nov. 12, 2019 including the specification, drawings and abstract is incorporated herein by reference in its entirety.

BACKGROUND

The present invention relates to an image processing device and an image processing method.

In the liquid crystal display device, there is a request for high-contrast (improved visibility), particularly in automotive equipment that is used in an outside light environment. Therefore, as a function of the image processing middleware SoC (System on Chip) mounted on the vehicle-mounted camera system, a technique for improving the visibility of the image using gamma correction for the brightness value of the local area unit with respect to the input image from the vehicle-mounted camera has been required. In the prior art relating to the improvement of image visibility, as a side effect of visibility improvement in the vicinity of the local area boundary, a problem that generates an unnatural image occurs.

In the prior art, the total gain is calculated based on the gamma correction value suitable for the pattern calculated from the gain value and the luminance distribution by the peak ACL (Automatic Contrast Limit) control, the luminance modulation is performed by a single calculation. Thus, while suppressing the gradation deterioration, it is possible to increase the contrast and brightness accordance with the pattern characteristics (luminance distribution). The prior art covers not only the single light source but also the plurality light sources in the system structure of the backlight of the display unit. Therefore, in the case of a system structure in which gamma correction is controllable in local area units by a plurality of light sources, it is described that it is possible to calculate a pattern adaptive gamma characteristic in local area units.

There are disclosed techniques listed below. [Patent Document 1] Japanese Unexamined Patent Application Publication No. 2016-31492

SUMMARY

The prior art alone may be inadequate for improvement of visibility in the liquid crystal display device, particularly for high contrast in the vehicle-mounted camera system. Usually, when calculating the pattern adaptive gamma characteristic in units of the local area (Local Area, hereinafter referred to as LA), the optimal gamma correction value for each LA is calculated. Then, in order to prevent a sudden change in the correction value between LAs, the correction is performed by using linear interpolation in the vicinity of the boundary between LAs. However, in the case that adjacent Las have different characteristics, when the optimal gamma correction is performed for each LA, the brightness value is reversed near the border. This results in an unnatural image.

An example of an unnatural image is shown in FIG. 15A, FIG. 15B and FIG. 15O. The image of FIG. 15A is divided into grid-shaped areas as shown in FIG. 15B and gamma correction is performed to each area. The FIG. 15O shows the result of performing gamma correction when FIG. 15A and FIG. 15C are compared, the visibility of objects (people, cars) in the image is improved, but the level difference noise (gradation) is generated in the whole image. Such images are simply considered to have degraded image quality, and caused discomfort to viewers and drivers. Furthermore, particularly in the vehicle-mounted camera system, since the driver's attention is directed to unnatural areas other than the area where visual recognition is required, it becomes an obstacle to safe driving.

An object of the present invention is to provide an image processing device that generates a high-quality image with good visibility.

The image processing device acquires the feature quantity (maximum value, minimum value, average value, histogram, etc. of the brightness value) of the whole area (Global Area, hereinafter referred to as GA) of the image and the feature quantity of each LA from the input image, and calculates a plurality of modulation gain values (gamma correction curves) for GA and each LA. Furthermore, the image processing device determines the correction intensity for each LA from the feature quantity of the GA and the feature quantity of each LA, and creates the LA correction intensity map. Finally, the image processing device finally applies the result of combining a plurality of modulation gain values based on the LA correction intensity map to the input image.

According to the image processing device according to an embodiment, an image with high image quality and good visibility can be generated.

BRIEF DESCRIPTION OF THE DRAWINGS

FIG. 3A and FIG. 3B are tables showing examples of LA correction intensity maps.

FIG. 5 is a processing flow of the LA correction intensity unit in the first embodiment.

DETAILED DESCRIPTION

First Embodiment

Figure 1:
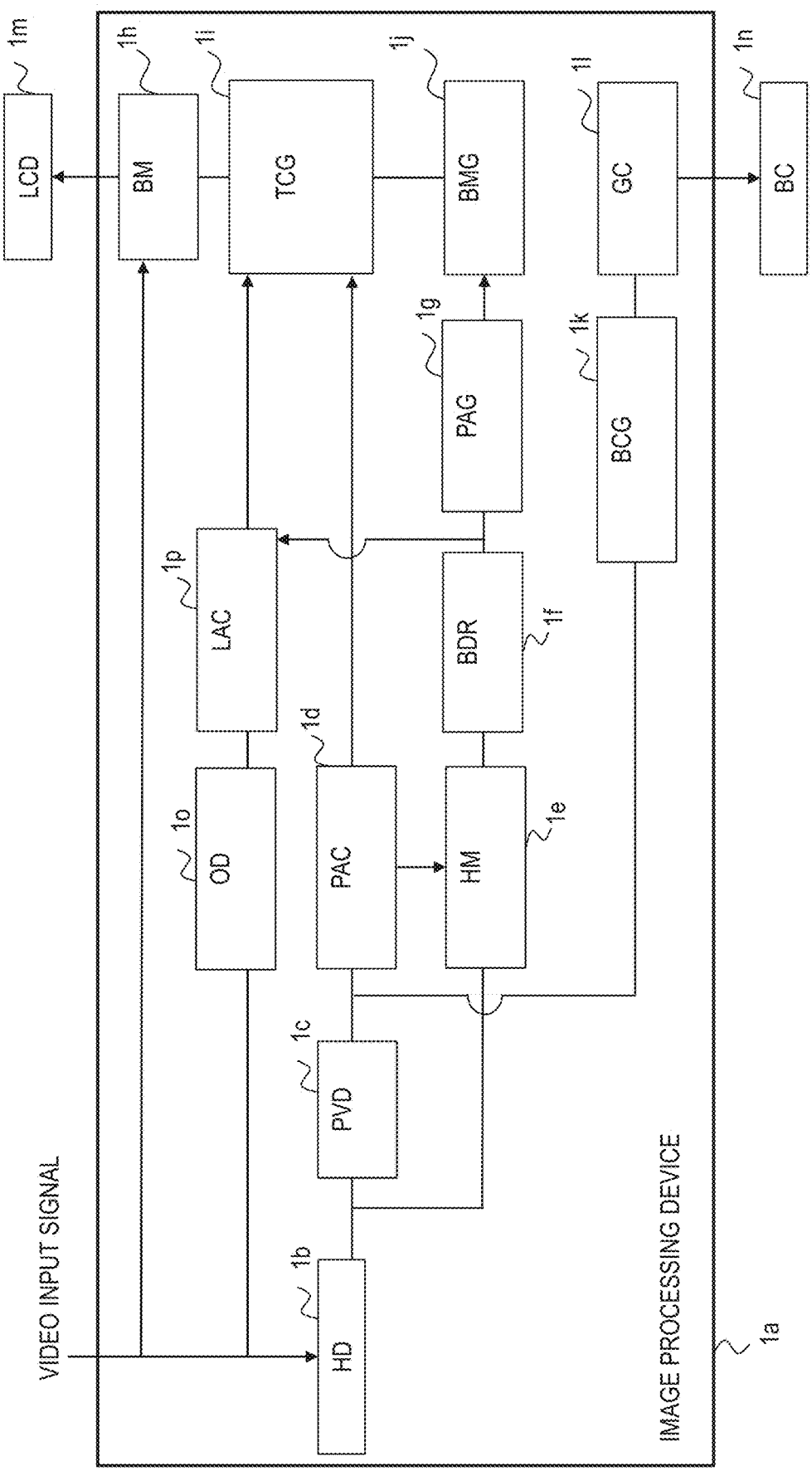
FIG. 1 is a block diagram illustrating an exemplary configuration of the image processing device according to the first embodiment.

Hereinafter, the image processing device according to the first embodiment will be described in detail with reference to the drawings. In the specification and the drawings, the same or corresponding elements are denoted by the same reference numerals, and a repetitive description thereof is omitted. In the drawings, for convenience of description, the configuration may be omitted or simplified. Also, at least some of the embodiments and each modification may be arbitrarily combined with each other.

(Configuration of the Image Processing Device)

The image processing device (1a) according to the first embodiment calculates and output a video output signal to be supplied to the liquid crystal panel (LCD, 1m) as a display device to be connected, and a backlight control signal to be supplied to the backlight control unit (BC, 1n) attached to the liquid crystal panel (LCD, 1 m) respectively from a video input signal. Further, as shown in FIG. 1, the image processing device (1a) includes a histogram detecting unit (HD, 1b), a peak value detecting unit (PVD, 1c), a peak ACL (Automatic Contrast Limit) control gain calculating unit (PAC, 1d), a brightness modulating unit (BM, 1h), a backlight control gain calculating unit (BCG, 1k), and a gain converting unit (GC, 1l). Furthermore, the image processing device (1a) includes a histogram modulating unit (HM, 1e), a brightness distribution rate calculating unit (BDR, 1f), a pattern adaptive gamma characteristic calculating unit (PAG, 1g), a brightness modulation gain in calculating unit (BMG, 1j), a total control gain calculating unit (TCG, 1i), an object detecting unit (OD, 1o), and an LA correction intensity unit (LAC, 1p).

The histogram detecting unit (HD, 1b) calculates the frequency distribution of the brightness value of the entire GA of the input video signal and the brightness value of each LA. Here, LA is a divided area obtained by dividing the GA into a plurality of areas.

The peak value detecting unit (PVD, 1c) detects the highest brightness among the video levels (brightness) possessed by the pixels of GA of the input video signal. In addition, the highest brightness among the video levels of LA pixels in each LA is detected.

As in the present embodiment, by detecting the peak value from the histogram (frequency distribution) of the brightness extracted by the histogram detecting unit (HD, 1b), as compared with the case of detecting the peak value directly from the input video signal, the stability of the detection is improved. Because, for example, when the total number of pixels in one screen (1 frame) is 100%, and the frequencies (number of pixels) are accumulated in order from the lowest brightness, by detecting the brightness value when the cumulative value of the histogram reaches 98% as the peak value, the brightness is not detected as the peak value when several pixels have an outstanding high brightness due to noise or the like.

The peak ACL control gain calculating unit (PAC, 1d) calculates the peak ACL control gain of the entire image, which is a gain corresponding to the peak value of the detected GA, and supplies the modulation gain value to the total control gain calculating unit (TCG, 1i) and the histogram modulating unit (HM, 1e). Similarly, the peak ACL control gain calculating unit (ACG, 1d) computes the peak ACL control gain of each LA, which is a gain corresponding to the peak value of each LA detected, and supplies the modulation gain value to the total control gain calculating unit (TCG, 1i) and the histogram modulating unit (HM, 1e).

The backlight control gain calculating unit (BCG, 1k), with respect to the gain converting unit (GC, 1l), to execute the gain process corresponding to each of the peak value and the peak value of each LA of GA detection by the peak value detecting unit (PVD, 1c).

The histogram modulating unit (HM, 1e) performs the modulation process on the histogram of GA output from the histogram detecting unit (HD, 1b) and the histogram of each LA with the gain obtained from the peak ACL control gain calculating unit (PAC, 1d). In practice, the histogram modulating unit (HM, 1e) performs gain modulation on the video level. The modulation processing with the peak ACL control gain for the histogram is a processing in which the histogram detection value at each video level is read as the histogram detection value at the video level of the peak ACL control gain multiple.

For example, when the video signal is 8 bits, the video level is 256 gradations, so gain processing is performed for this level. If the peak detection value is 50%, there will be no it histogram at the video level 128 or higher representing 50% brightness, and the peak ACL control gain will be doubled. Then, the histogram existing in the video level 128 is read as a histogram existing in the video level 256 (the maximum value of 255 in 8 bits in the actual processing) by performing 128×2 gain processing. Here, the number of gradations of the histogram is described as the same as that of the video signal 256, but the number of gradations of the histogram is the same processing even in the case of 16 or 64 generally employed.

The brightness distribution rate calculating unit (BDR, 1f) analyzes the distribution status of the histogram of the GA that has been modulated with the GA peak ACL control gain. Similarly, each distribution state of the histogram of each LA modulated with each LA peak ACL control gain is analyzed. The distribution state of the histogram includes, for example, a distribution biased in some video level layers, a distribution biased in multiple video level areas, a relatively uniform distribution with no remarkable evenness. The brightness distribution rate calculating unit (BDR, 1f) performs a pre-processing for performing weighting for each video level on the input histogram, accumulates the histogram detected values after the weighting, and calculates the distribution rate from the values. The brightness distribution rate calculating unit (BDR, 1f) is a feature data calculating unit that computes a feature quantity as the first feature data indicating the features of GA and a feature quantity as the second feature data group indicating the features of each LA. Features are maximum value, minimum value, average value and histogram of brightness value. From the distribution of the brightness values of each pixel in the image, it is possible to calculate the average value of the brightness values and the brightness values of the maximum and minimum. Further, it is possible to create a histogram by calculating the number of pixels for each brightness value.

Figure 2A:
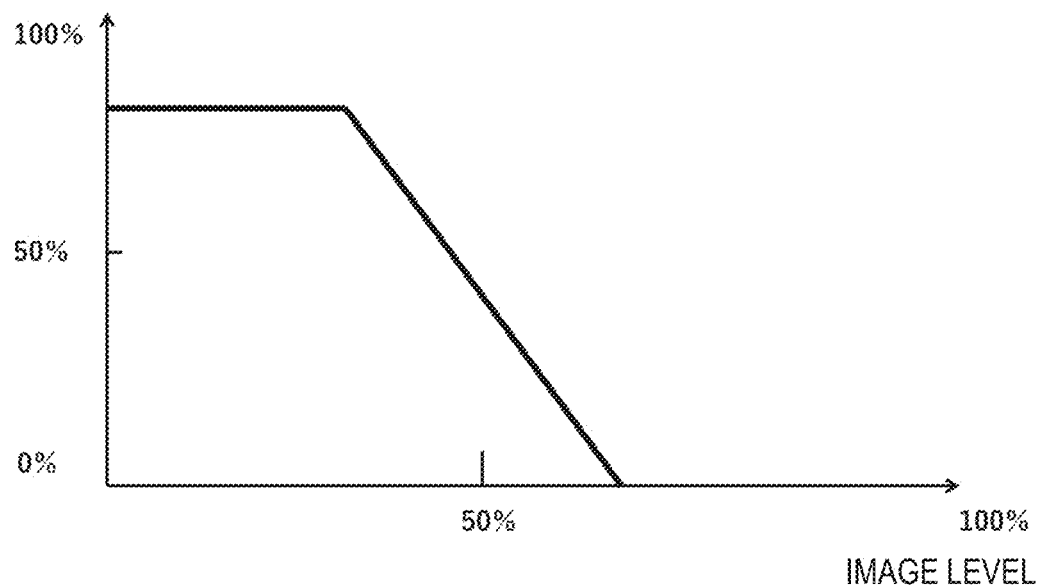
FIG. 2A and FIG. 2B is a diagram for explaining a pre-process for brightness distribution rate calculation.

As a specific example, the brightness distribution rate calculating unit (BDR, 1f) performs weighting processing on the histogram detected value from the low video level to the intermediate video level, accumulates the histogram detected values after weighting, and calculates the distribution rate of the low/intermediate video level from the magnitude of the value (FIG. 2A).

Figure 2B:
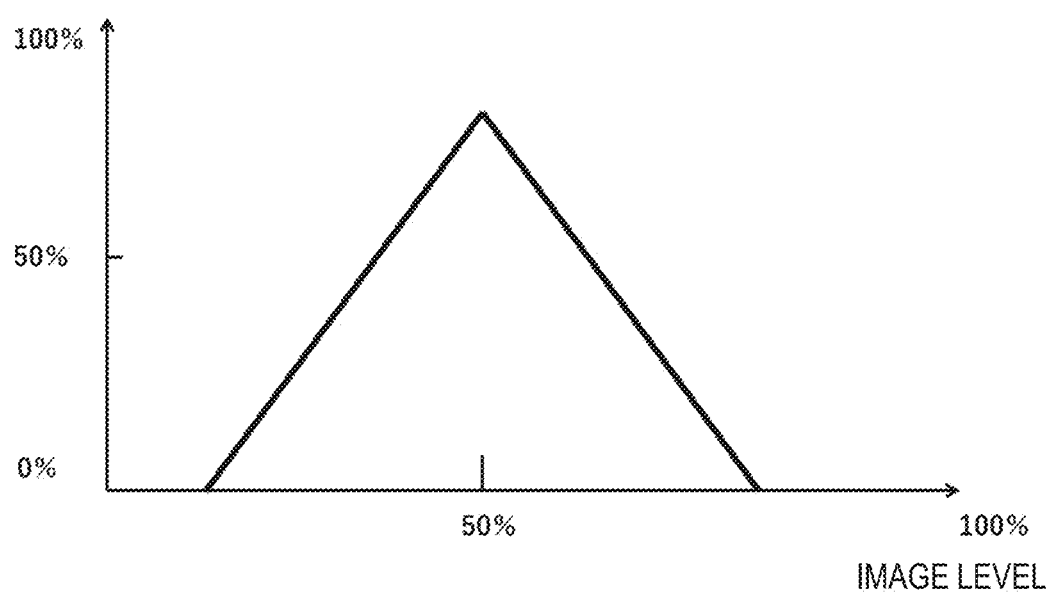

Further, the brightness distribution rate calculating unit (BDR, 1f) performs a weighting process near the intermediate video level, accumulates the histogram detected values after the weighting, and calculates the distribution rate near the intermediate video level from the magnitude of the values (FIG. 2B). Of course, the method of calculating the low/intermediate video level distribution rate and the distribution rate near the intermediate video level is not limited thereto.

In the pattern adaptive gamma characteristic calculating unit (PAG, 1g) appropriate gamma characteristics are automatically calculated for GA and LA according to the calculated video level distribution rate. For example, in the case of pattern adaptive gamma processing for the purpose of obtaining a brightness improvement effect for backlight control, small gamma value correction (when the distribution state of the histogram a relatively uniform distribution with no remarkable universality) or S-curve correction (when the distribution state of the histogram is ubiquitous in one place) is performed. In addition, histogram equalization (planarized) is performed in the case of correction processing in which the histogram distribution state after brightness modulation is uniformly distributed from a low video level to a high video level.

As described above, the effect of performing brightness modulation by automatically calculating the gamma characteristic adapted to the pattern, there are the following two points in the first point, when a brighter image is input with a higher contrast than the original, in the brightness modulation processing by the fixed gamma characteristics, the danger of causing saturation (white crushing) in the high video level area and saturation (black crushing) in the low video level zero is assumed. However, these dangers can be prevented by the pattern adaptation processing. The second point, depending on the pattern characteristics (distribution center of the image level=concentrated brightness level), it is possible to obtain the effect of the most effectively high contrast and brightness improvement.

The brightness modulation gain calculating unit (HMG, 1j) calculates the brightness modulation gain to GA and LA according to the gamma characteristic given from the pattern adaptive gamma characteristic calculating unit (PAG, 1g). The brightness modulation gain is given to the GA and each LA as a function that relates the value of the modulated video level.

In the total control gain calculating unit (TCG, 1i), a plurality of modulation gain values obtained from the peak ACL control gain calculating unit (PAC, 1d) and the brightness modulation gain calculating unit (BMG, 1j) are multiplied according to the correction intensity for each LA calculated by the user-set MIX ratio or LA correction intensity unit (LAC, 1p), and the total gain value is calculated in advance. For the synthesis of the gamma correction curve, when the LA correction intensity is α, the weighted average as shown below is used.

Correction amount after synthesis=correction amount of LA×correction amount of α+GA×(1−α)

Here, $0 \leq \alpha \leq 1$, the correction intensity of LA becomes stronger as α is closer to 1.

In the brightness modulating unit (BM, 1h), the brightness modulation is performed using this total gain value. Brightness modulation refers to a process of converting the video level (brightness) of each pixel of the input video signal into another video level according to the value of the video level.

The brightness modulating unit (BM, 1h) is constituted by, for example, a one dimensional lookup table. When the video signal is 8 bits and 256 gradations, it can be configured by a memory of 256 words×8 bits. Instead of implementing a look-up table, it can also be implemented in pre-functionalized hardware or software.

An object detecting unit (OD, 1o) as a detecting unit detects an object recorded in a ROM (Read Only Memory) or a RAM (Random Access Memory) from an input image. One way to detect an object is to use the edge between the object and the background from the image. The detected object is verified against the object recorded in ROM or RAM by pattern recognition, and is specified. Finally, the object detecting unit (OD, 1o) outputs the position information (coordinates), the area, and the matching result of the object as the object information to the LA correction intensity unit (LAC, 1p).

In the LA correction intensity unit (LAC, 1p), in order to set the correction intensity (first correction intensity) of each LA based on the feature quantities (maximum value, minimum value, average value, and histogram of the brightness value) of GA and each LA obtained from the brightness distribution rate calculating unit (BDR, 1f), the first 1LA correction intensity map is created. The LA correction intensity map is a table corresponding to LA, and the numerical value means LA correction intensity. The LA correction intensity, for example, a value of 0 to 1 set. Specifically, the LA correction intensity unit (LAC, 1p) compares the whole feature quantity obtained from the brightness distribution state analysis result with the LA feature quantity, and determines, for each LA, whether the reversal of the brightness value or the overexposure/blackout occurs between adjacent LAB after correction. The LA correction intensity unit (LAC, 1p) sets a weak LA correction intensity such that an unnatural gradient mentioned as a problem does not occur in the element of the corresponding table in the LA in which it is determined that the brightness value is reversed or the brightness value is skipped or the black collapse occurs between adjacent LAs.

Figure 4A:
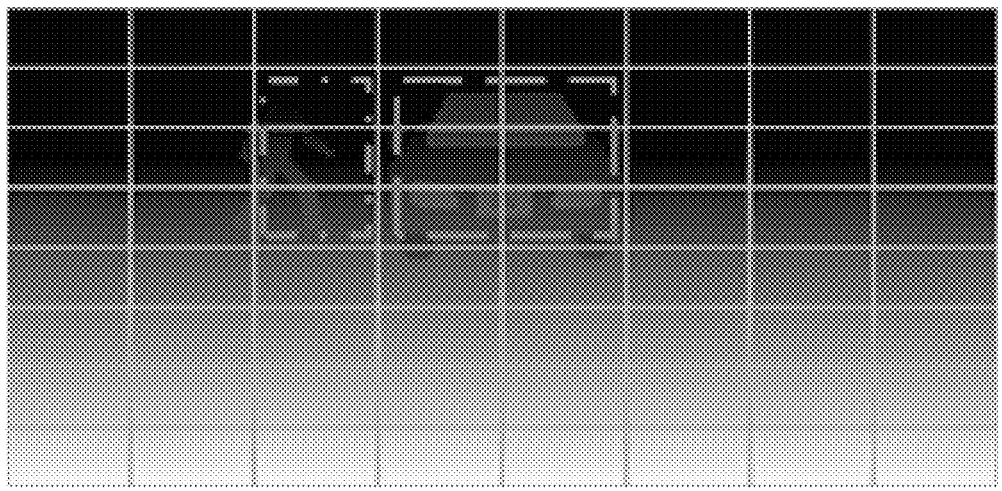
FIG. 4A is a diagram illustrating an image reflecting the coordinate information of an object with respect to LA.

Through the above processing, images with high image quality and good visibility can be generated. Furthermore, the LA correction intensity unit (LAC, 1p) creates 2LA correction intensity map in order to set the correction intensity (second correction intensity) for each LA based on the position information (coordinate information), the area, and the matching result of the object obtained from the object detecting unit (OD, 1o). For example, if an area surrounded by a broken line in FIG. 4A is given as the coordinate information and the area of the object, as shown in FIG. 3B, the LA correction intensity unit (LAC, 1p) creates a correction intensity map (second LA correction intensity map) that strongly sets the correction intensity of the LA included in this area.

Figure 4B:
FIG. 4B is a diagram illustrating an image after application of the present embodiment.

Here, the LA correction intensity unit (LAC, 1p) sets the LA correction intensity to each element of the table according to the ranking of remarkable objects recorded in ROMs and RAMs. For example, when the LA correction intensity takes a value ranging from 0 to 1, the LA correction intensity unit (LAC, 1p) determines that, the closer to 1, the more significant the LA is. In the example of FIGS. 3A and 3B, the vehicle is set to 1, the person is set to 0.9. As shown in FIG. 3B, by creating second LA correction intensity map, as shown in FIG. 4B, images with high image quality and good visibility suitable for objects included in the shooting scene can be generated.

Finally, the LA correction intensity unit (LAC, 1p) determines the correction intensity map to be supplied to the total control gain calculating unit. (TCG, 1i) by adding two correction intensity maps as shown in the following equation.

LA correction intensity map (m,n)=first LA correction intensity map (m,n) second LA correction intensity map (m, n) Thereafter, the LA correction intensity unit (LAC, 1p) performs normalization so that the respective LA correction intensities have a maximum value of 1. Incidentally, if 0 is set in either of the LA correction intensity map before synthesis without performing normalization, it may be used as it is one of the intensity.

FIG. 5 is a flow of the correction intensity map creation process in the first embodiment. The result of the analysis of the brightness distribution state is acquired (step S501), and 1LA corrected intensity map required for the correction to prevent the white jump and the black collapse is created (step S502). Next, the object detection result is acquired by the object detecting unit (1o) (step S503), it is determined whether or not an object of interest exists (step S504), and if an object of interest exists, 2LA correction intensity map based on the object position information is created (step S505), and first LA correction intensity map and second LA correction intensity map are synthesized (step S506). If there are no objects of interest in the stepped S504, only first LA corrected intensity map is used. The processing order shown here is not limited to this, and second LA correction intensity map may be created prior to first LA correction intensity map.

The image processing device (1a) of the present embodiment shown in FIG. 1 may be implemented by hardware or may be implemented by middleware in which a portion of the image processing methods to be mounted are implemented by software.

Figure 6:
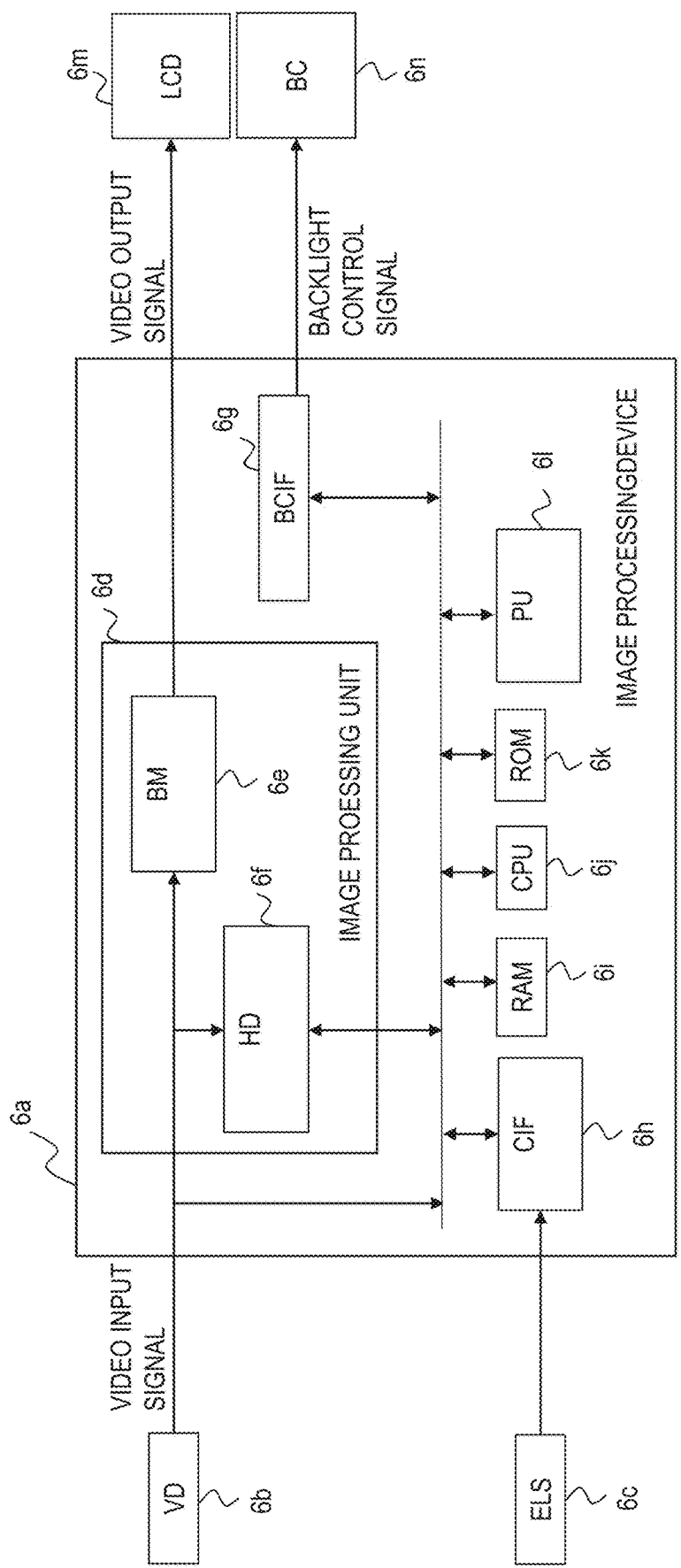
FIG. 6 is a block diagram showing an exemplary configuration of the SoC of the image processing device according to the first embodiment.

FIG. 6 is a block diagram showing an exemplary SoC configuration of the image processing device according to the first embodiment. The image processing device (6a) is connected to a display panel (6m) such as a liquid crystal to which a backlight control unit (BC, 6n) is attached, and a video device (VD, 6b) for inputting a video signal. Furthermore, an external in light sensor (ELS, 6c) may be connected. The video device (VD, 6b) is, for example, cameras, video content media players such as Blu-ray and DVDs, digital television receivers (DTVs), and the like. The image processing device (6a) consists of a video processing unit (6d), a CPU (6j), a ROM (6k), a BAN (6i), a backlight control interface (I/F) unit (BCIF, 6g), a communication interface (I/F) unit (CIF, 6h), and other peripheral units (PU, 6l) connected to each other via a bus.

The video processing unit (6d) receives the video signal input from the video device (VD, 6b), and supplies the object detection unit (not shown) mounted by the software stored in the ROM (6k), the brightness modulating unit (BM, 6e) and the histogram detecting unit (HD, 6f), respectively, and outputs the video output signal output from the brightness modulating unit (BM, 6e) to the liquid crystal panel (LCD, 6m). The backlight control interface (I/F) unit (BCIF, 6g) outputs the backlight control signal to the backlight control unit (BC, 6n) of the display panel to be connected. When the external light sensor (ELS, 6c) is connected, the external light sensor is connected to a communication interface (I/F) unit (CIF, 6h), such as an I2C (Inter-Integrated Circuit), for example.

The brightness modulating unit (BM, 6e), histogram detecting unit (HD, 6f), backlight control interface (I/F) unit (BCIF, 6g), and communication interface (I/F) unit (CIF, 6h), respectively, are accessible from the CPU (6j) through the bus. Each processing unit in the video processing unit (6d) (the peak value detecting unit (PVD, 1c), the peak ACL control gain calculating unit (PAC, 1d), the histogram modulating unit (HM, 1e), the brightness distribution rate calculating unit (BDR, the pattern adaptive gamma characteristic calculating unit (PAG, 1g), the brightness modulation gain calculating unit (BMG, 1j), the object detecting unit (OD, 1o), the LA correction intensity unit (LAC, 1p), and the total control gain calculating unit (TCG, 1i)) is implemented by software stored in the ROM (6k), and the total control gain calculated by the total control gain calculating unit (not shown) is set to the brightness modulating unit (BM, 6e) via the bus.

The backlight control gain calculating unit (BCG, 1k) and the gain converting unit (GC, 1l) shown in FIG. 1 are similarly implemented by software stored in the ROM (6k), the backlight control gain calculated by the gain converting unit is output as a backlight control signal via the backlight control interface (I/F) unit (BCIF, 6g).

The configuration shown in FIG. 6 is merely an example and can be variously modified. For example, some of the hardware included in the video processing unit (6d) may be changed to be implemented in software, or other functions may be implemented in hardware to be included in the video display unit. The CPU (6j) may be a single processor of any architecture and may be a multi-processor unit including plurality of processors.

Further, the CPU (6j) or an alternative processor, the multi-processor may include cache memory or local memory. The buses may also be hierarchical. The ROM (6k) may be an electrically rewritable non-volatile memory, such as a flash memory, or may be configured by a SoC without a non-volatile memory and loaded with software in a power-up sequence or the like.

Effect of the First Embodiment

The correction intensity is determined by creating a correction intensity map for each LA based on the feature amount of GA, and the correction intensity is multiplied by a plurality of modulation gain values (gamma correction curves) obtained from the peak ACL control gain calculating section and the brightness modulation gain calculating section according to the correction intensity of each LA determined to calculate a total gain value (gamma correction curve). By applying the total gain value obtained by this to the input image, an image with high image quality and good visibility can be generated.

Second Embodiment

Figure 7:
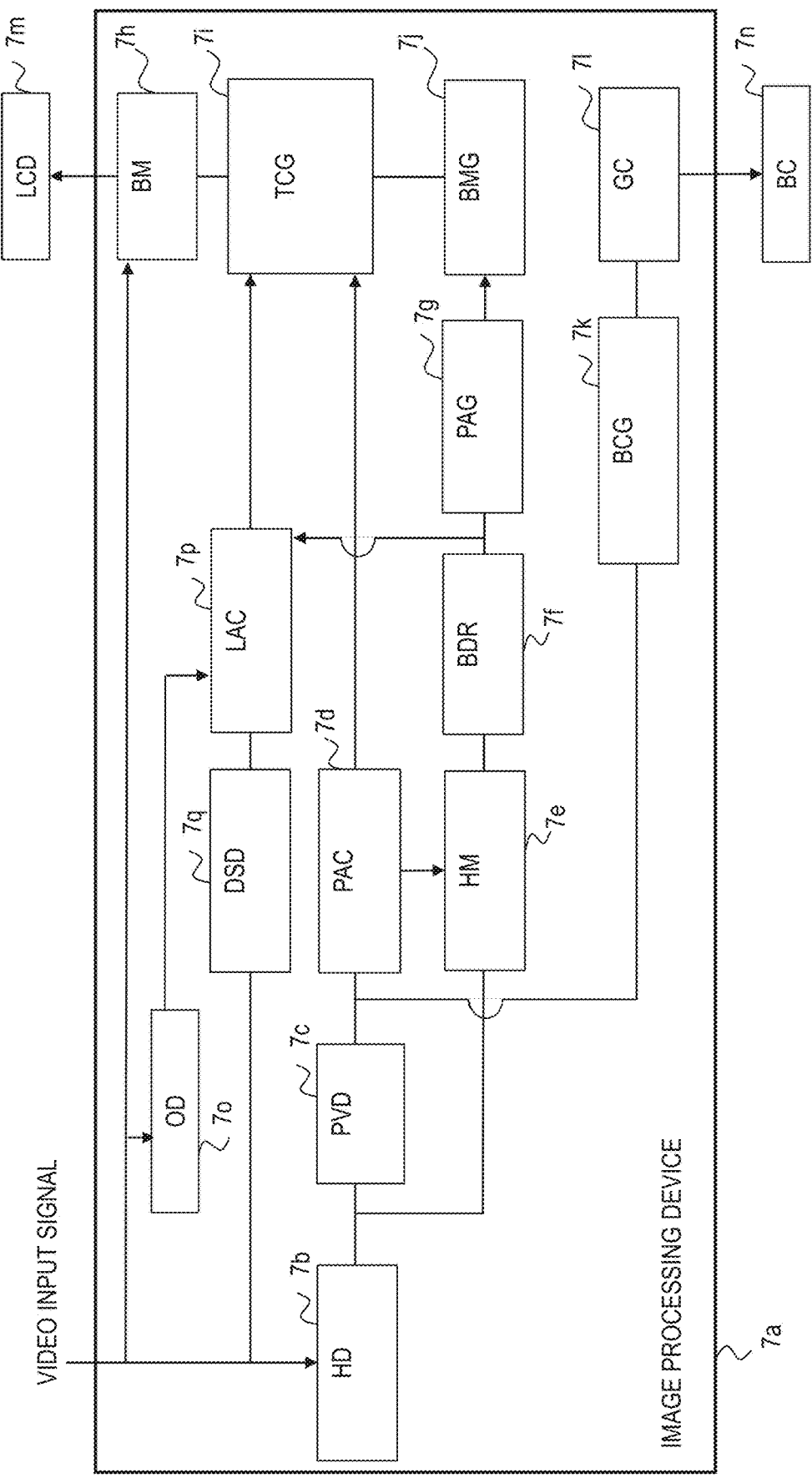
FIG. 7 is a block diagram illustrating an exemplary configuration of the image processing device according to the second embodiment.

The image processing device according to the second embodiment is improved on the assumption that the image processing device according to the first embodiment is mounted on a vehicle such as an automobile. The image processing device in the second embodiment is mounted on a vehicle-mounted camera system for using an electronic mirror, a rear view, a display of a camera image such as a surround view for driving assistance of the driver. The image processing device (7a) according to the second embodiment differs from the first embodiment in that, as shown in FIG. 7, there is driving scene discriminating unit (7q) for discriminating the driving scene based on the driving information. Each of the symbol 7x of FIG. 7 (x=a, b, c, . . . , p) corresponds to the symbol 1x of FIG. 1 (x=a, b, c, . . . , p).

The driving scene discriminating unit (DSD, 7q) discriminates the driving scene from the information (driving information) of the vehicle speed and the steering control obtained through the ECU (Electronic Control Unit). The driving scene discriminating unit (DSD, 7q) determines whether a vehicle equipped with an image processing device (7a) is running at a high speed or at a low speed, is heading to the right of the front of the vehicle, or is heading to the left, etc. Then, the driving information that is the determination result is supplied to the LA correction intensity unit (LAC, 7p), the LA correction intensity unit (LAC, 7p) to set the correction intensity for each LA considering the operation information (third correction intensity), to create a third LA correction intensity map. Driving information is any one or combined information of the vehicle speed, the traveling direction of the vehicle.

Figures 8A, 8B:
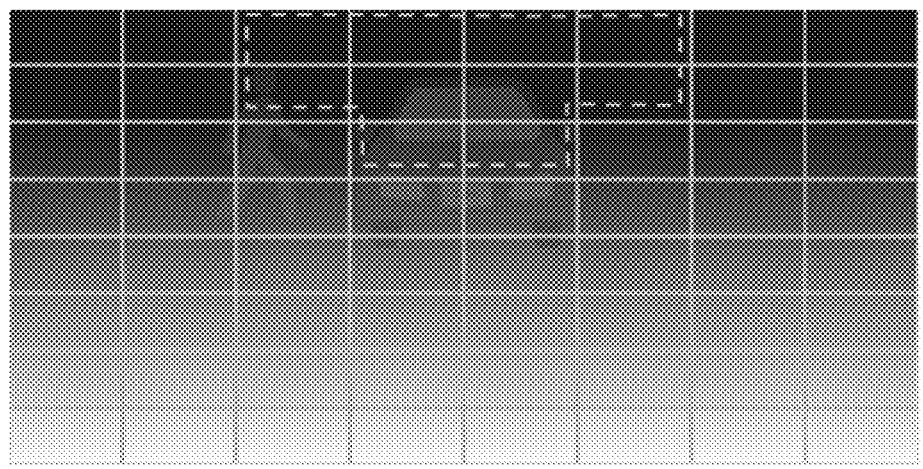
FIG. 8A and FIG. 8B are examples (at high speed) of the LA correction intensity map according to the vehicle speed.
Figures 9A, 9B:
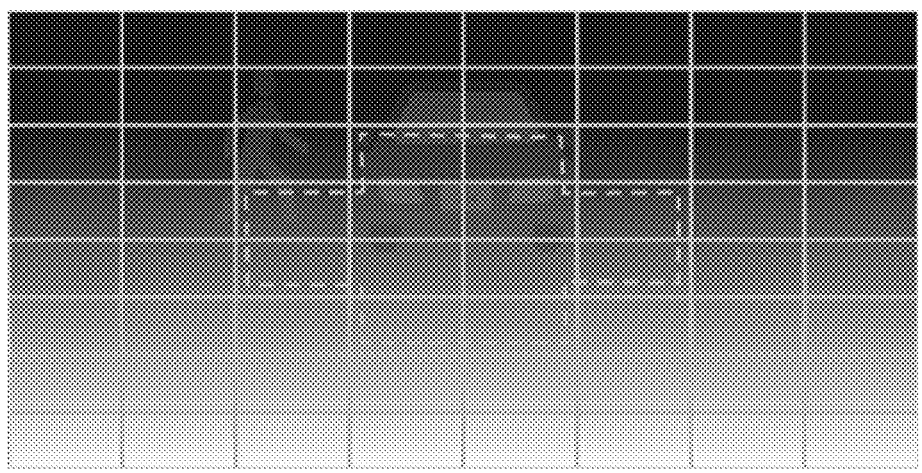
FIG. 9A and FIG. 9B are examples of LA correction intensity map corresponding to the vehicle speed (middle speed).
Figures 10A, 10B:
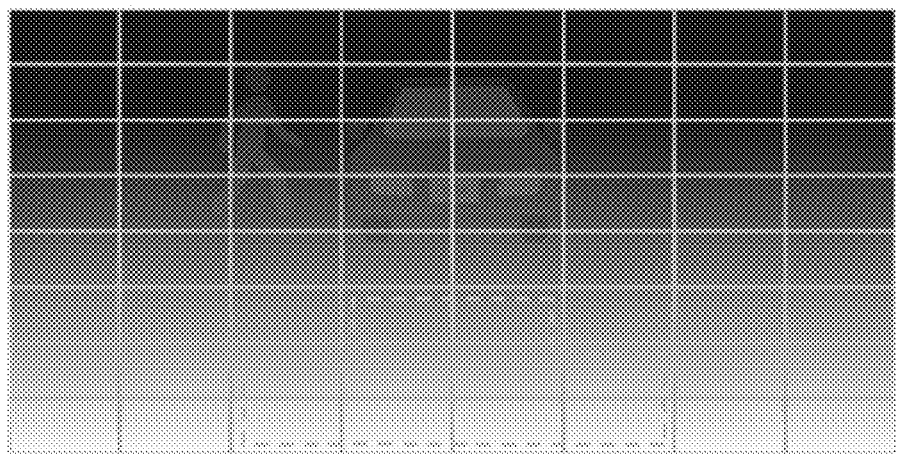
FIG. 10A and FIG. 10B are examples of LA correction intensity map corresponding to the vehicle speed (low speed).

For example, when it is determined that the vehicle is traveling at a high speed, since the visual recognition of an object approaching from a far distance becomes important, the LA correction intensity unit (LAC, 7p) creates an LA correction intensity map in which the importance degree as shown in FIG. 8B is set so that the upper portion of the image shown in FIG. 8A becomes more important than the other portions. Further, when it is determined that the vehicle is traveling at a medium speed, since the visual recognition of the central object becomes important, the LA correction intensity unit (LAC, 7p) creates an LA correction intensity map in which the importance degree as shown in FIG. 9B is set so that the center of the image shown in FIG. 9A becomes more important than the other parts. Further, since the information of the low-speed running and around the vehicle is important in the case of parking and stopping, LA correction intensity unit (LAC, 7p), as the lower portion of the image shown in FIG. 10A is more important than the other portions, FIG. 10B to create an LA correction intensity map that sets the importance as shown in.

Figures 11A, 11B:
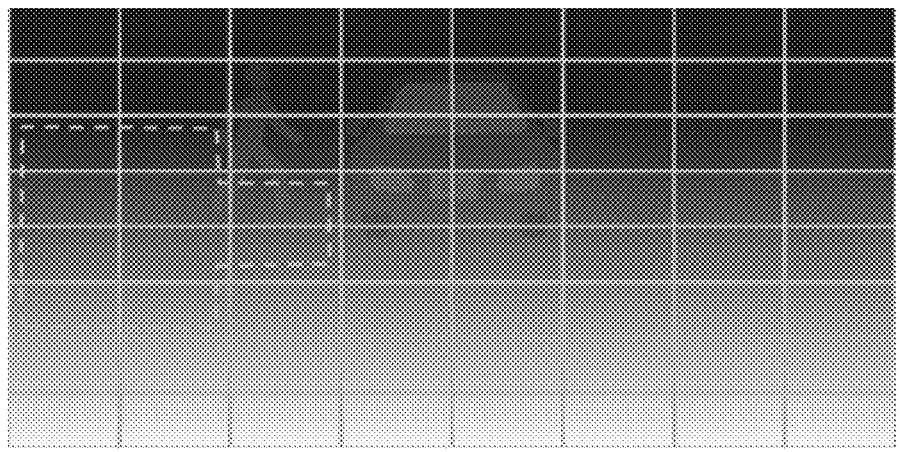
FIG. 11A and FIG. 11B are examples of LA correction intensity map corresponding to the traveling direction (at the time of left turning).
Figures 12A, 12B:
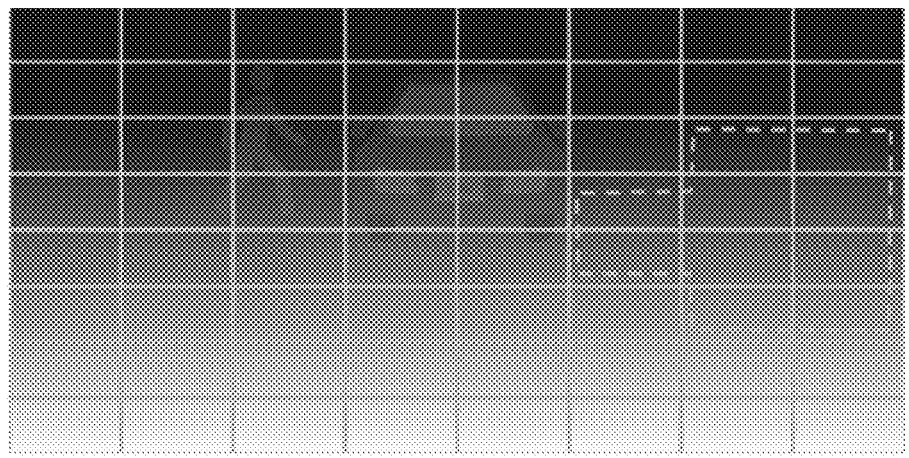
FIG. 12A and FIG. 12B are examples of LA correction intensity map corresponding to the traveling direction (at the time of t turning).

In addition, it is also possible to control the correction intensity according to the driving scene by interlocking with the steering control and setting the important area according to the traveling direction. At the time of left turning, the LA correction intensity unit (LAC, 7p) creates an LA correction intensity map in which the importance degree as shown in FIG. 11B is set so that the left side of the image shown in FIG. 11A becomes more important than the other parts. Further, at the time of right turning, the LA correction intensity unit (LAC, 7p) creates an LA correction intensity map in which the importance degree as shown in FIG. 12B is set so that the left side of the image shown in FIG. 12A becomes more important than the other portions. Finally, by adding the third LA correction intensity map and the first LA correction intensity map and the second LA correction intensity map according to the first embodiment, the correction intensity map to be supplied to the total control gain calculation unit (TCG, 7i) is determined.

Figure 13:
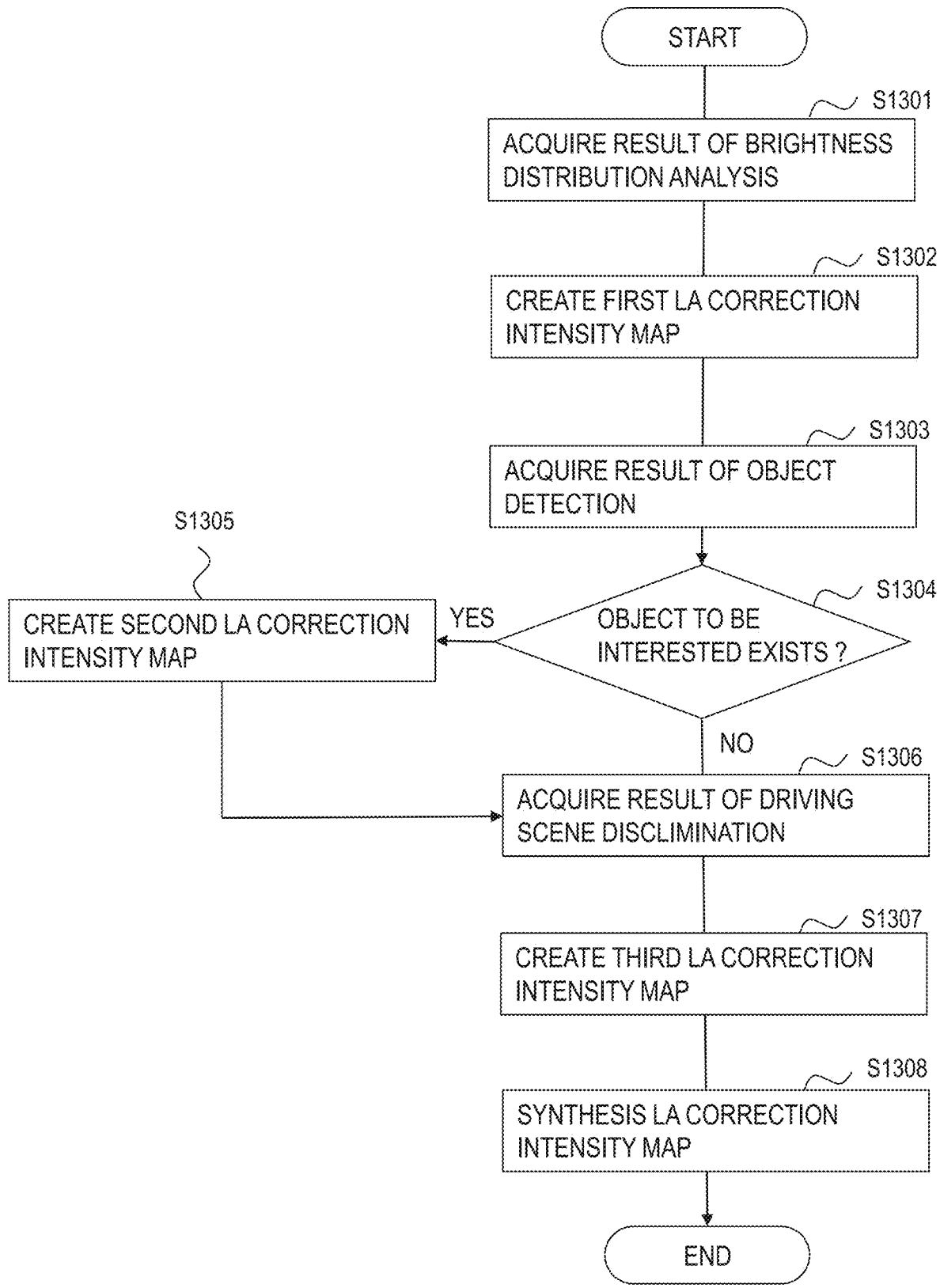
FIG. 13 is a processing flow of the LA correction intensity unit in the second embodiment.

FIG. 13 is a flow of the correction intensity map creation process in the second embodiment. The result of the analysis of the brightness distribution state is acquired (step S1301), and the first LA corrected intensity map required for the correction to prevent the white jump and the black collapse is created (step S1302). Next, the object detection result is acquired by the object detection unit (7o) (step S1303), and it is determined whether or not an object of interest exists (step S1304), and if an object of interest exists, the second LA corrected intensity map based on the object position information is created (step S1305). The operation scene discrimination result is acquired by the operation scene discrimination section (7q) (step S1306), and the third LA corrected intensity map based on the operation scene is created (step S1307). Next, the first LA correction intensity map, the second LA correction intensity map, and the third LA correction intensity map are synthesized to create a correction intensity map to be used for correction (step S1308). If there is no object of interest in the step S1304, the step S1306 and the step S1307 are processed, and the first LA correction intensity map and the third LA correction intensity map are synthesized in the step S1308 to create a correction intensity map to be used for correction. The processing order shown here is not limited to this, and the third LA correction intensity map may be created prior to the first LA correction intensity map.

Figure 14:
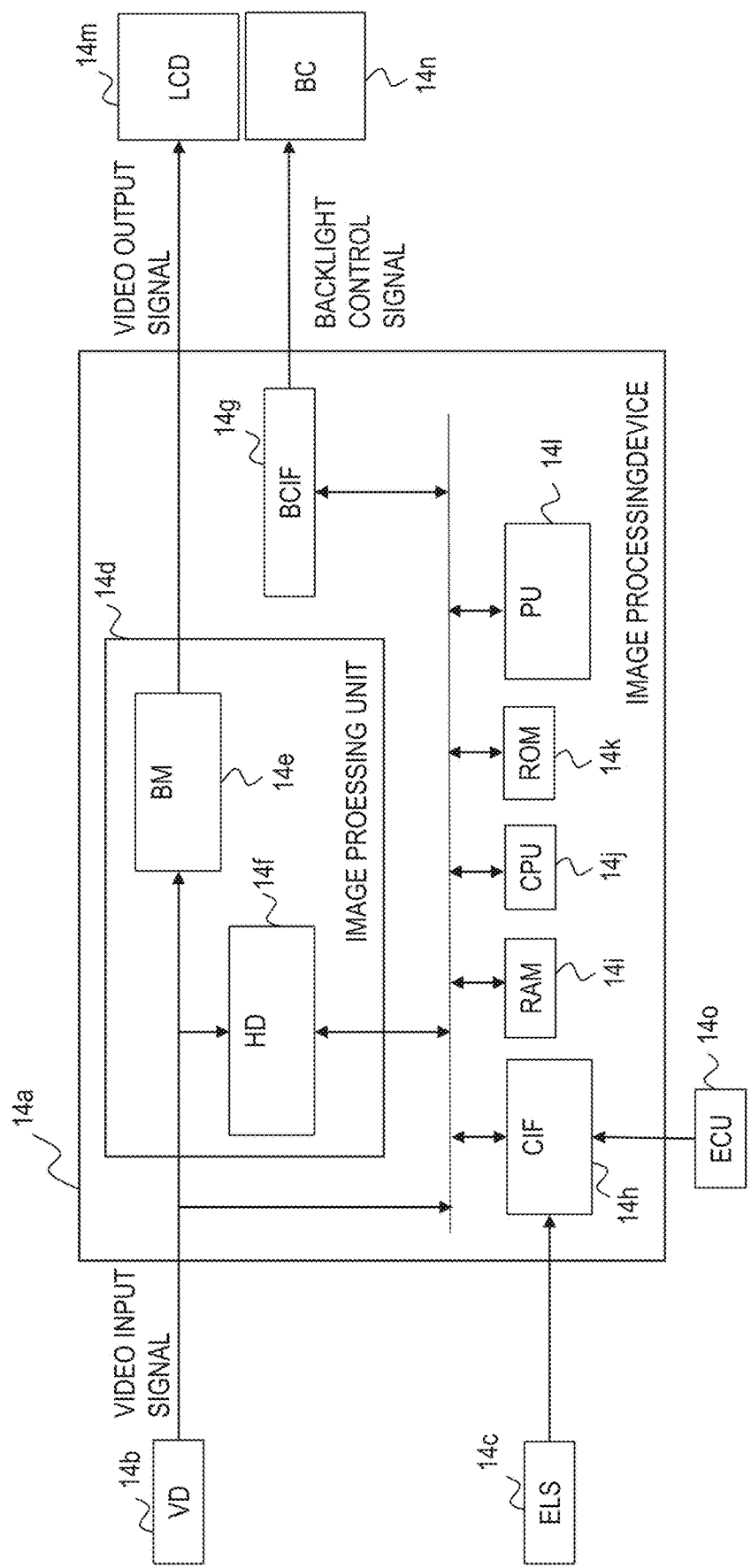
FIG. 14 is a block diagram illustrating an exemplary configuration of an SoC of an image processing device in the second embodiment.
Figure 15A:
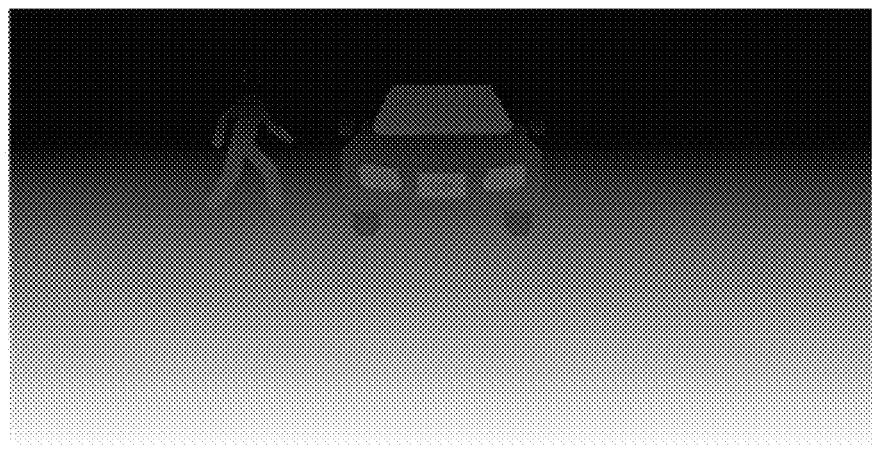
FIG. 15A, FIG. 15B and FIG. 15C are diagrams showing a corrected image in the prior art.
Figure 15B:
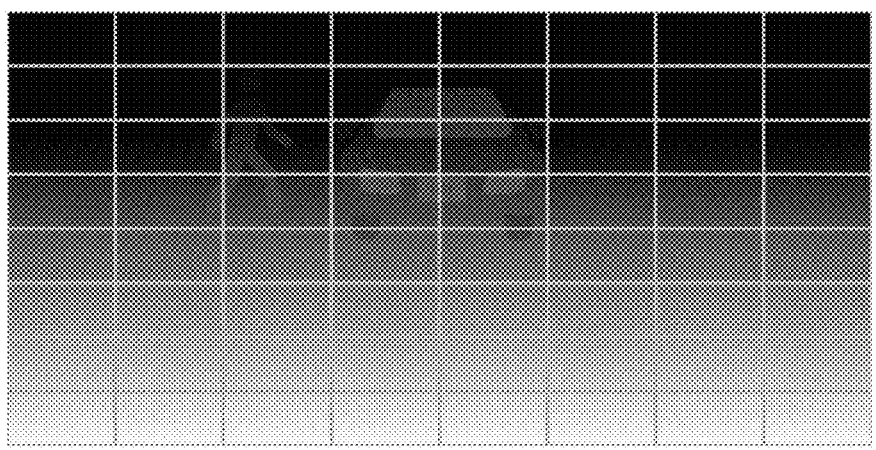
Figure 15C:
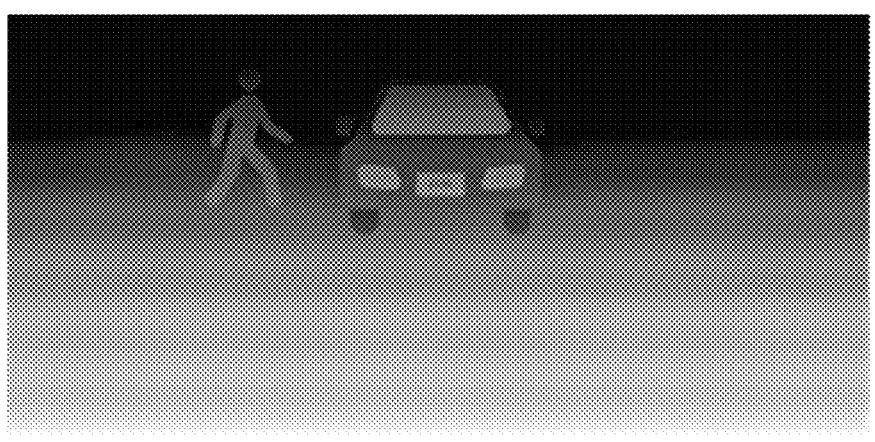

FIG. 14 is a block diagram showing an exemplary SoC configuration of the image processing device according to the second embodiment. The difference from the first embodiment is that the ECU (14o) is connected to a communication interface (I/F) unit (CIF, 14h) such as I2C. Operation scene determination unit (not shown) is accessible through the bus from the CPU(14j). The operation scene discrimination unit is implemented by software stored in the ROM (14k). This is only one example, as in the configuration shown in FIG. 6, it can be variously changed. Reference numeral 14x of FIG. 14 (x=a, b, n) respectively correspond to the reference numeral 6x of FIG. 6 (x=a, b, n).

Effect of the Second Embodiment

Based on the running information as information of the vehicle-mounted system other than the vehicle-mounted camera, by the driving scene discriminating unit for determining the driving scene has been added, even if there is an unknown object that cannot be detected only by the object detecting unit, by changing the weighting of the correction for each LA, it is possible to correct the optimum brightness value according to the driving scene, a good image visibility with high image quality can be generated.

Modified Example

Based on the object position coordinate information of the object detecting unit, the LA is grouped, and the gamma correction curve is calculated for each grouped area. This enables object-specific correction by grouping while reducing the throughput.

Although the invention made by the present inventors has been specifically described with reference to embodiments, the present invention is not limited thereto, it is needless to say that various modifications can be made without departing from the scope of the present invention.

Although described image processing device in the vehicle-mounted camera system in the second embodiment, the present invention is not limited thereto, video signal processing in general (e.g., NAVI(Navigation), car products such as car entertainment, DTVs (Digital Television), PC (Personal Computer), home products such as monitors, tablets, are applicable to mobile products such as smartphones).

What is claimed is:

1. An image processing device that generates a video output signal and a backlight control signal from a video input signal and outputs the generated video output signal and the generated backlight control signal to a display device, the image processing device comprising:
   a CPU; and
   a memory storing instructions that, when executed by the CPU, cause the CPU to function as:
   a feature data calculating unit for obtaining an entire area of a video from the video input signal and a divided area obtained by dividing the entire area into a plurality of areas, and calculating a first feature data indicating characteristics of the entire area and a second feature data group indicating features of each divided area;

a correction data calculating unit for calculating correction data for correcting video data for each divided area from the first feature data and the second feature data group;

a correction processing unit for performing image correction of the entire area based on the correction data;

a correction intensity unit for setting a first correction intensity for each divided area from the first feature data and the second feature data group;

a detection unit for detecting an object included in the video from the video input signal, and outputting object information including position information of the detected object; and a discriminating unit for determining a driving scene from driving information of a vehicle onto which the image processing device is mounted and outputting the driving information, wherein the correction intensity unit sets a second correction intensity based on the object information, wherein the correction intensity unit sets a third correction intensity based on the driving information, and wherein the correction data calculating unit adjusts the correction data based on the first correction intensity, the second correction intensity, and the third correction intensity.

2. The image processing device according to claim 1, wherein the first feature data and the second feature data group include at least one of a maximum value, a minimum value, an average value, and a histogram of a brightness value.

3. The image processing device according to claim 1, wherein the first correction intensity, the second correction intensity, and the third correction intensity are data in a map format in which the correction intensity for each divided area is set.

4. The image processing device according to claim 1, wherein the driving information is any one or combined information of a vehicle speed of the vehicle and a traveling direction of the vehicle.

5. An image processing method for generating a video output signal and a backlight control signal from a video input signal and outputting to a display device, the image processing method comprising:

a feature data calculating step of obtaining an entire area of video from the video input signal and a divided area obtained by dividing the entire area into a plurality of areas, and calculating first feature data indicating features of the entire area, and a second feature data group indicating features of each divided area;

a correction data calculating step of calculating correction data for correcting video data for each divided area from the first feature data and the second feature data group;

a correction processing step of performing video correction of the entire area based on the correction data;

a correction intensity setting step of setting a first correction intensity for each divided area from the first feature data and the second feature data group;

a detection step of detecting an object included in the video from the video input signal, and outputting object information including position information of the detected object; and a determination step of determining a driving scene from driving information of a vehicle and outputting the driving information, wherein the correction intensity setting step sets a second correction intensity based on the object information, wherein the correction intensity setting step sets a third correction intensity based on the driving information, and wherein the correction data calculating step adjusts the correction data based on the first correction intensity, the second correction intensity, and the third correction intensity.

* * * * *